US012118929B2

(12) United States Patent
Ha et al.

(10) Patent No.: US 12,118,929 B2
(45) Date of Patent: Oct. 15, 2024

(54) LIGHT EMITTING DISPLAY DEVICE AND DRIVING METHOD OF THE SAME

(71) Applicant: LG DISPLAY CO., LTD., Seoul (KR)

(72) Inventors: Sung Chul Ha, Gyeonggi-do (KR); Jin Cheol Hong, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/746,129

(22) Filed: May 17, 2022

(65) Prior Publication Data

US 2022/0383806 A1 Dec. 1, 2022

(30) Foreign Application Priority Data

May 27, 2021 (KR) ........................ 10-2021-0068322

(51) Int. Cl.
*G09G 3/3208* (2016.01)

(52) U.S. Cl.
CPC ... *G09G 3/3208* (2013.01); *G09G 2300/0814* (2013.01); *G09G 2300/0857* (2013.01); *G09G 2310/0286* (2013.01)

(58) Field of Classification Search
None
See application file for complete search history.

(56) References Cited

U.S. PATENT DOCUMENTS

2006/0071893 A1 4/2006 Nishina et al.
2013/0285998 A1* 10/2013 Hong ...................... G06F 3/038 345/212
2015/0022562 A1* 1/2015 Tsubakino ........... G09G 3/3275 345/89
2015/0255042 A1 9/2015 Oh et al.
2018/0144707 A1* 5/2018 Tsuchi .................. H03F 3/4521
2018/0190171 A1* 7/2018 Tashiro .................... G09G 3/20
2019/0197979 A1 6/2019 Kim et al.
2021/0255753 A1* 8/2021 Ahn ........................ G06F 3/044
2022/0044641 A1* 2/2022 Park ..................... G09G 3/3275
2022/0114975 A1* 4/2022 Kim ..................... G09G 3/3426
2022/0189370 A1* 6/2022 Jung ........................ G09G 3/20
2022/0309998 A1* 9/2022 Lim ..................... G09G 3/3233

FOREIGN PATENT DOCUMENTS

| | | | |
|---|---|---|---|
| CN | 1577477 | A | 2/2005 |
| CN | 1758318 | A | 4/2006 |
| CN | 1945679 | A | 4/2007 |
| CN | 102956212 | A | 3/2013 |
| CN | 103377628 | A | 10/2013 |
| CN | 104916244 | A | 9/2015 |
| CN | 108091307 | A | 5/2018 |
| KR | 10-1333519 | B1 | 11/2013 |
| KR | 10-1480842 | B1 | 1/2015 |
| KR | 10-1978937 | B1 | 5/2019 |

OTHER PUBLICATIONS

European Search Report dated Oct. 7, 2022 issued in Patent Application No. 22173731.5 (9 pages).
Chinese Office Action dated Jul. 19, 2024 issued in Patent Application No. 202210545331.8 w/English Translation (15 pages).

* cited by examiner

*Primary Examiner* — Benjamin C Lee
*Assistant Examiner* — Emily J Frank
(74) *Attorney, Agent, or Firm* — POLSINELLI PC

(57) ABSTRACT

A display device includes a display panel configured to display an image, a data driver configured to supply a data voltage to the display panel, and a timing controller configured to control the data driver, and the data driver pauses a data latch operation.

18 Claims, 16 Drawing Sheets

LIGHT EMITTING DISPLAY DEVICE AND DRIVING METHOD OF THE SAME

CROSS-REFERENCE TO RELATED APPLICATION

This application claims the priority of Korean Patent Application No. 10-2021-0068322 filed on May 27, 2021, which is hereby incorporated by reference in its entirety.

BACKGROUND

Field of the Disclosure

The present disclosure relates to a light emitting display device and a driving method of the same.

Description of the Background

In accordance with advances in information technology, the market for a display device which is a connection medium between a user and information is expanding. Accordingly, use of a display device such as a light emitting display device (LED), a quantum dot display device (QDD), a liquid crystal display device (LCD), etc. is increasing.

The above-mentioned display devices include a display panel including sub-pixels, a driver configured to output a drive signal for driving of the display panel, a power supply configured to generate power to be supplied to the display panel or the driver, etc.

In such display devices, when a drive signal, for example, a scan signal and a data signal, is supplied to the sub-pixels formed at the display panel, selected ones of the sub-pixels transmit light therethrough or directly emit light and, as such, an image may be displayed.

SUMMARY

Accordingly, the present disclosure is directed to a light emitting display device and a driving method of the same that substantially obviate one or more problems due to limitations and disadvantages.

More specifically, the present disclosure is to provide a light emitting display device and a driving method thereof which are capable of eliminating a problem caused by power noise (latch failure, screen flickering, etc.), thereby achieving an enhancement in display quality and an enhancement in driving reliability and driving stability.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, a light emitting display device includes a display panel configured to display an image, a data driver configured to supply a data voltage to the display panel, and a timing controller configured to control the data driver, wherein the data driver pauses a data latch operation.

The data driver may pause the data latch operation, corresponding to a falling time or a rising time of a source output enable signal.

The pause of the data latch operation may be carried out by a latch hold signal generated from the data driver or the timing controller.

The data driver may include a shift register configured to pause output of a clock signal in order to pause the data latch operation, corresponding to the latch hold signal.

The shift register may include an AND gate configured to AND the latch hold signal and a shift clock signal to output a resultant signal, and a flip-flop configured to output a clock signal based on the signal output from the AND gate and a pulse externally applied thereto.

When the latch hold signal is generated with a logic low level, a latch connected to the shift register may have a latch hold period in which the latch pauses the data latch operation.

The shift register may include an inverter configured to invert the latch hold signal and to output an inverted latch hold signal, an AND gate configured to AND the inverted latch hold signal output from the inverter and a shift clock signal and to output a resultant signal, and a flip-flop configured to output a clock signal based on the signal output from the AND gate and a pulse externally applied thereto.

When the latch hold signal is generated with a logic high level, a latch connected to the shift register may have a latch hold period in which the latch pauses the data latch operation.

In another aspect of the present disclosure, a method for driving a light emitting display device including a display panel configured to display an image, a data driver configured to supply a data voltage to the display panel, and a timing controller configured to control the data driver includes transferring, to the data driver, data including a control packet and a data packet via an interface coupled between the timing controller and the data driver, and generating a latch hold period such that a data latch operation of the data driver is paused in a transfer period of the data pack.

In the generating a latch hold period, the latch hold period may be generated, corresponding to a falling time or a rising time of a source output enable signal activating output of the data driver.

In accordance with the present disclosure, there is an effect capable of eliminating a problem caused by power noise (latch failure, screen flickering, etc.), thereby achieving an enhancement in display quality. In accordance with the present disclosure, there is an effect capable of preventing output abnormality of an amplifier, an increase in blank period, an increase in transmission frequency (or an increase in transmission bandwidth), etc., thereby achieving an enhancement in driving reliability and driving stability.

BRIEF DESCRIPTION OF THE DRAWINGS

The accompanying drawings, which are included to provide a further understanding of the disclosure and are incorporated in and constitute a part of this application, illustrate aspect(s) of the disclosure and along with the description serve to explain the principle of the disclosure.

In the drawings.

DETAILED DESCRIPTION

A display device according to the present disclosure may be embodied as a television, an image player, a personal computer (PC), a home theater, a car electric device, a smartphone, etc., without being limited thereto. The display device according to the present disclosure may be embodied as a light emitting display device (LED), a quantum dot display device (QDD), a liquid crystal display device (LCD), etc. For convenience of description, however, the following description will be given in conjunction with an example in which the display device according to the present disclosure is a light emitting display device configured to directly emit light based on an inorganic light emitting diode or an organic light emitting diode.

Figure 1:
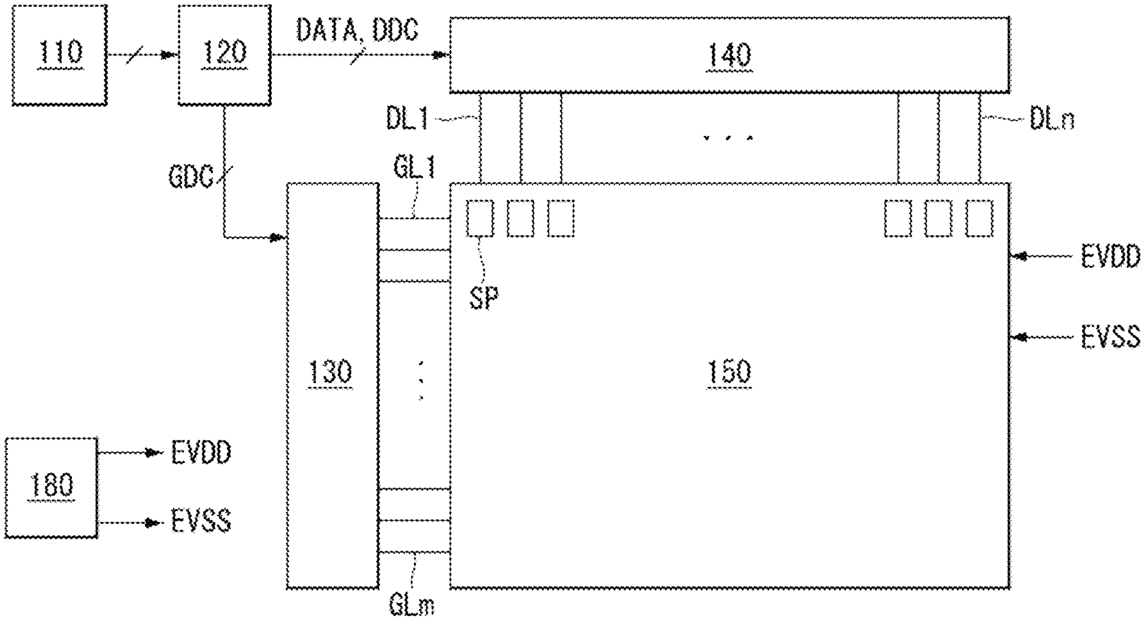
FIG. 1 is a block diagram schematically showing a light emitting display device.
Figure 2:
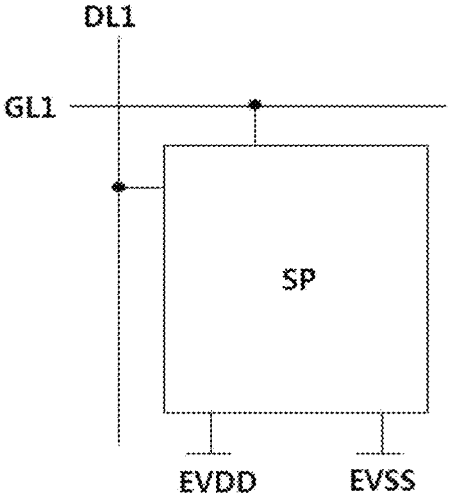
FIG. 2 is a configuration diagram schematically showing a sub-pixel shown in FIG. 1.

FIG. 1 is a block diagram schematically showing a light emitting display device. FIG. 2 is a configuration diagram schematically showing a sub-pixel shown in FIG. 1.

As shown in FIGS. 1 and 2, the light emitting display device may include an image supplier 110, a timing controller 120, a gate driver 130, a data driver 140, a display panel 150, a power supply 180, etc.

The image supplier 110 (a set or a host system) may output various drive signals as well as an image data signal supplied from an exterior thereof or an image data signal stored in an internal memory. The image supplier 110 may supply the data signal and the various drive signals to the timing controller 120.

The timing controller 120 may output a gate timing control signal GDC for control of operation timing of the gate driver 130, a data timing control signal DDC for control of operation timing of the data driver 140, various synchronization signals (a vertical synchronization signal Vsync and a horizontal synchronization signal Hsync), etc. The timing controller 120 may supply, to the data driver 140, a data signal DATA supplied from the image supplier 110, together with the data timing control signal DDC. The timing controller 120 may be formed in the form of an integrated circuit (IC) and, as such, may be mounted on a printed circuit board, without being limited thereto.

The gate driver 130 may output a gate signal (or a scan signal) in response to the gate timing control signal GDC, etc. supplied from the timing controller 120. The gate driver 130 may supply a gate signal to sub-pixels included in the display panel 150 via gate lines GL1 to GLm. The gate driver 130 may be formed in the form of an IC or may be directly formed on the display panel 150 in the form of a gate-in-panel structure, without being limited thereto.

The data driver 140 may sample and latch the data signal DATA in response to the data timing control signal DDC, etc. supplied from the timing controller 120, may convert a data signal having a digital form into a data voltage having an analog form, and may then output the resultant data voltage. The data driver 140 may supply the data voltage to the sub-pixels included in the display panel 150 via data lines DL1 to DLn. The data driver 140 may be formed in the form of an IC and, as such, may be mounted on the display panel 150 or a printed circuit board, without being limited thereto.

The power supply 180 may generate first power of a high level and second power of a low level based on an external input voltage supplied from an exterior thereof, and may output the first power and the second power through a first power line EVDD and a second power line EVS S. The power supply 180 may generate and output not only the first power and the second power, but also a voltage required for driving of the gate driver 130 (for example, a gate voltage including a gate-high voltage and a gate-low voltage) or a voltage required for driving of the data driver 140 (a drain voltage and a drain voltage including a half-drain voltage).

The display panel 150 may display an image, corresponding to the gate signal, the drive signal including the data voltage, the first power, the second power, etc. The sub-pixels of the display panel 150 directly emit light. The display panel 150 may be manufactured based on a substrate having stiffness or ductility, such as glass, silicon, polyimide, or the like. The sub-pixels, which emit light, may be constituted by a pixel including red, green and blue or a pixel including red, green, blue and white.

For example, one sub-pixel SP may be connected to the first data line DL1, the first gate line GL1, the first power line EVDD, and the second power line EVSS, and may include a pixel circuit constituted by a switching transistor, a driving transistor, a capacitor, an organic light emitting diode, etc. The sub-pixel SP used in the light emitting display device directly emits light and, as such, the circuit configuration thereof is complex. In addition, a compensation circuit configured to compensate for degradation of not only the organic light emitting diode, but also the driving transistor configured to supply drive current to the organic light emitting diode, etc. is also diverse. However, in FIG. 2, the sub-pixel SP is simply shown in the form of a block.

Meanwhile, in the above description, the timing controller 120, the gate driver 130, the data driver 140, etc. have been described as being individual configurations, respectively. However, one or more of the timing controller 120, the gate driver 130, and the data driver 140 may be integrated into one IC in accordance with an implementation type of the light emitting display device.

Figure 3A:
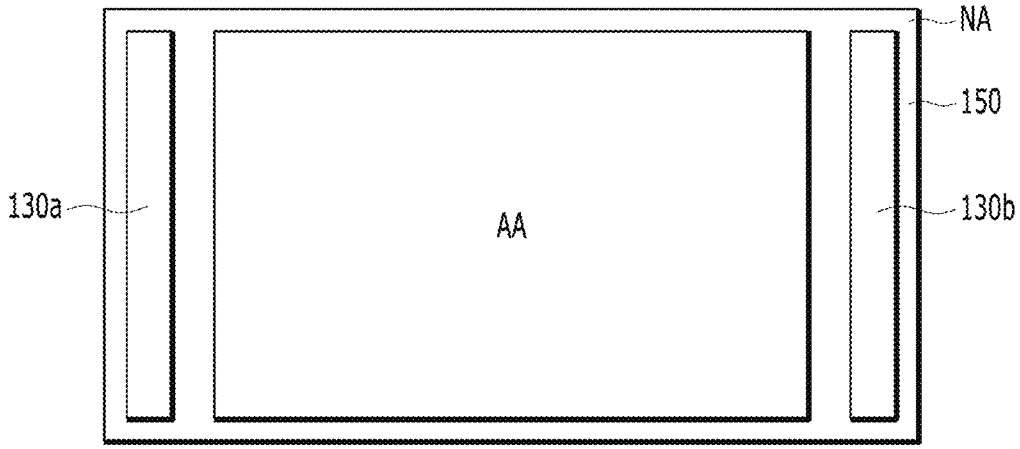
FIGS. 3A and 3B are views showing disposition examples of gate-in-panel type gate drivers.
Figure 3B:
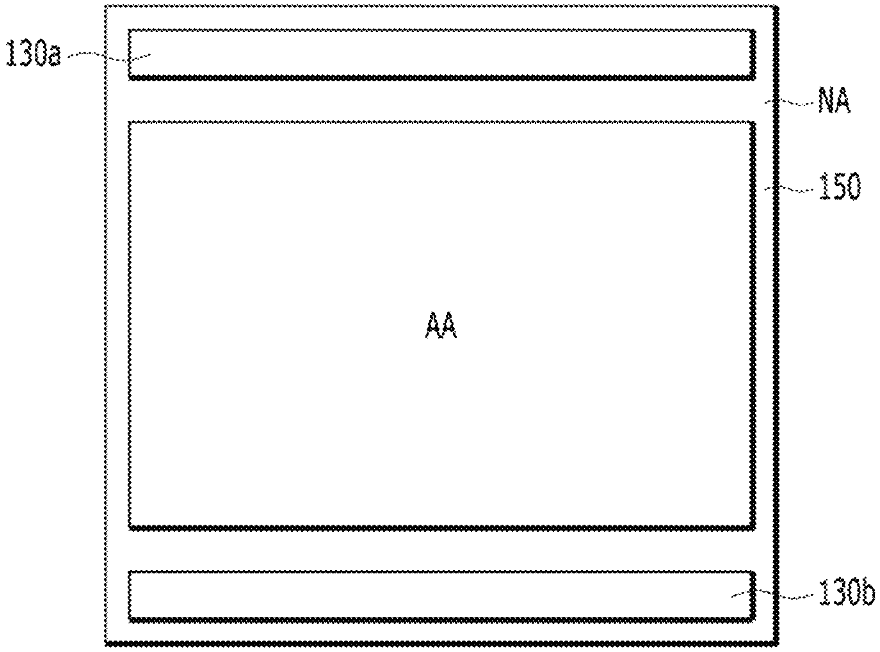
Figure 4:
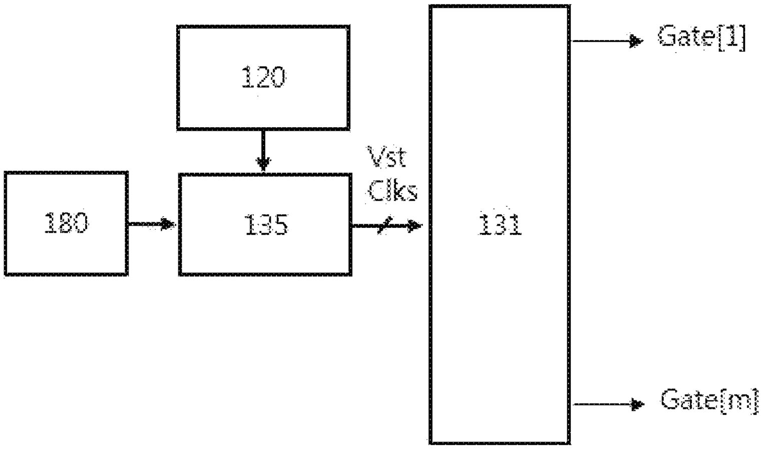
FIGS. 4 and 5 are block diagrams illustrating configurations of devices associated with a gate-in-panel type gate driver.
Figure 5:
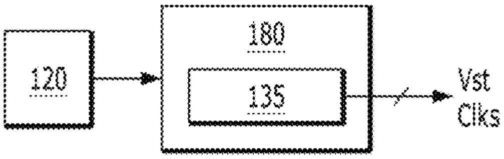

FIGS. 3A and 3B are views showing disposition examples of gate-in-panel type gate drivers. FIGS. 4 and 5 are block diagrams illustrating configurations of devices associated with a gate-in-panel type gate driver.

As shown in FIGS. 3A and 3B, gate-in-panel type gate drivers 130*a* and 130*b* are disposed in a non-display area NA of a display panel 150. As shown in FIG. 3A, the gate drivers 130*a* and 130*b* may be disposed at left and right non-display areas NA of the display panel 150, respectively. Alternatively, as shown in FIG. 3B, the gate drivers 130*a* and 130*b* may be disposed at upper and lower non-display areas NA of the display panel 150, respectively.

Although the gate drivers 130*a* and 130*b* have been illustrated and described in conjunction with examples in which the gate drivers 130*a* and 130*b* are disposed in the non-display areas NA disposed at left and right sides or upper and lower sides of the display area AA, only one gate driver may be disposed at the left, right, upper or lower non-display area NA.

As shown in FIG. 4, the gate-in-panel type gate driver may include a shift register 131 and a level shifter 135. The level shifter 135 may generate clock signals Clks and a start signal Vst based on signals and voltages output from a timing controller 120 and a power supply 180. The clock signals Clks may be generated in the form of a K-phase having K different phases (K being an integer of 2 or greater) such as 2-phase, 4-phase, 8-phase, etc.)

The shift register 131 may operate based on the signals Clks and Vst, etc. output from the level shifter 135, and may output gate signals Gate[1] to Gate[m] for turning on or off transistors formed at a display panel. The shift register 131 may be formed on the display panel in the form of a thin film in accordance with a gate-in-panel method. Accordingly, "130*a*" and "130*b*" in FIGS. 3A and 3B may correspond to the shift register 131.

Figure 6:
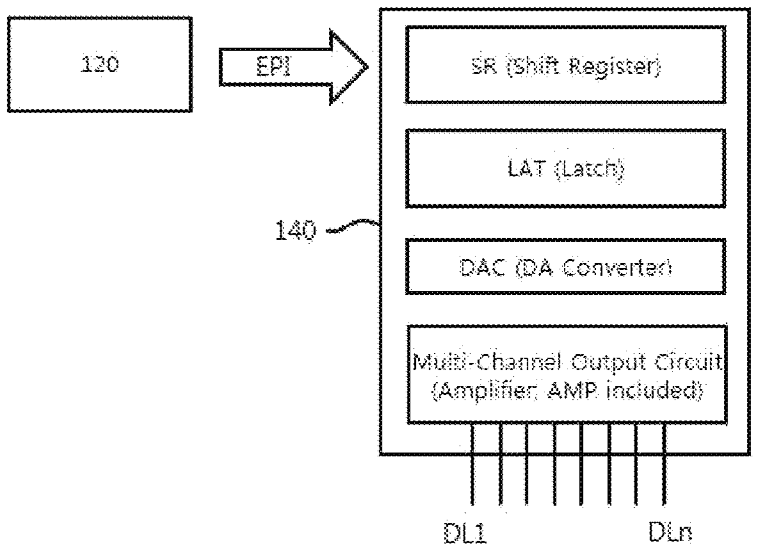
FIG. 6 is a diagram schematically showing internal blocks of a data driver connected to a timing controller.
Figure 7:
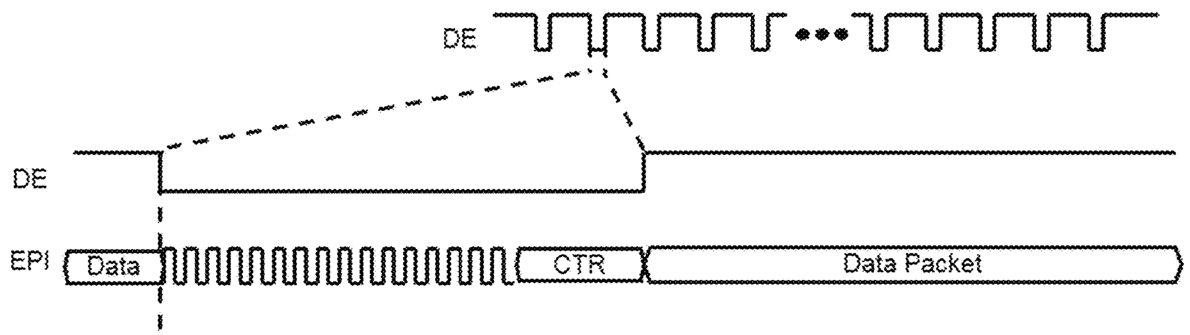
FIG. 7 is a diagram briefly explaining a data transfer mode between a timing controller and a data driver.

As shown in FIGS. 4 and 5, the level shifter 135 may be independently formed in the form of an IC, differently from the shift register 131, or may be included in a power supply 180. Of course, these configurations are only illustrative, and the present disclosure is not limited thereto. FIG. 6 is a diagram schematically showing internal blocks of a data driver connected to a timing controller. FIG. 7 is a diagram briefly explaining a data transfer mode between a timing controller and a data driver.

As shown in FIGS. 6 and 7, a timing controller 120 and a data driver 140 may receive and transmit various signals through an embedded clock point-to-point interface (EPI) EPI (simply referred to as an EPI interface EPI") based on an embedded clock scheme.

The various signals transferred through the EPI interface EPI may include a control packet CTR including control signals for controlling the data driver 140, a data packet including data signals to be applied to a display panel, a data enable signal DE defining an input period of a data signal of one line, etc. Meanwhile, the data driver 140 may generate the data enable signal DE based on a control signal included in the control packet CTR by itself.

The data driver 140 may include a shift register SR, a latch LAT, a DA converter DAC, a multi-channel output circuit, etc. The shift register SR, the latch LAT, the DA converter DAC, and the multi-channel output circuit may perform a function for converting a data signal to be applied to the display panel into a data voltage, based on various signals included in the control packet CTR and the data packet transferred via the EPI interface EPI, and other functions. Meanwhile, the internal blocks of the data driver 140 briefly shown in FIG. 6 are only illustrative and, as such, the present disclosure is not limited thereto.

Meanwhile, the data driver 140 may generate power noise during output operation of an internal device thereof (for example, upon data voltage output of an amplifier AMP included in the multi-channel output circuit). Hereinafter, a scheme for eliminating a problem caused by power noise in accordance with an aspect of the present disclosure will be described.

Figure 8:
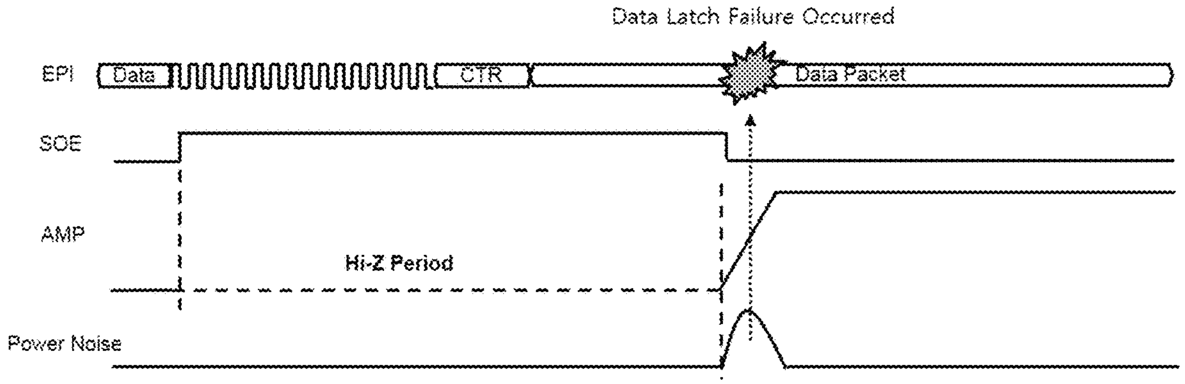
FIG. 8 is a diagram explaining a problem caused by power noise.
Figure 9:
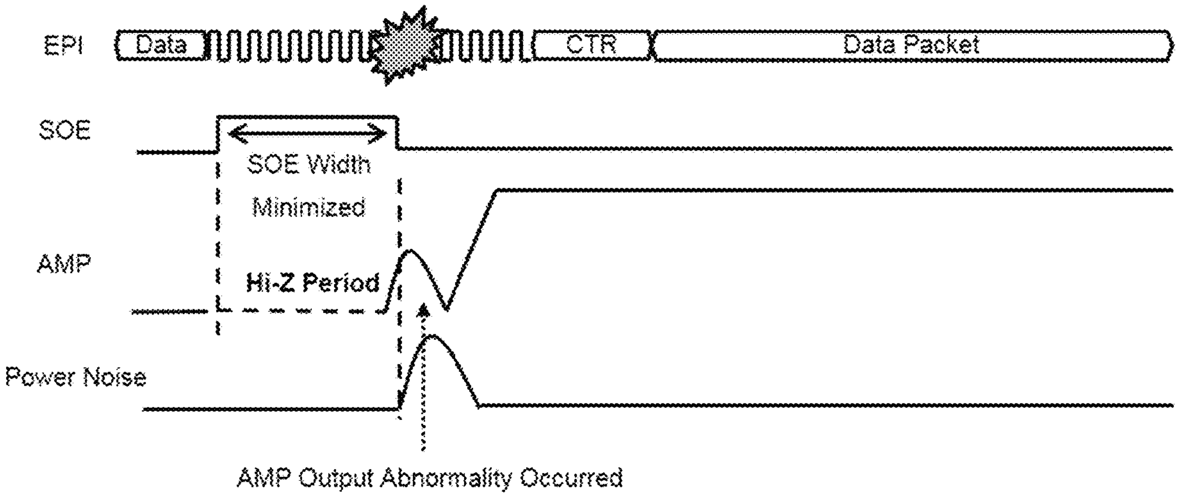
FIGS. 9 and 10 are diagrams explaining experimental examples for solving a problem caused by power noise.
Figure 10:
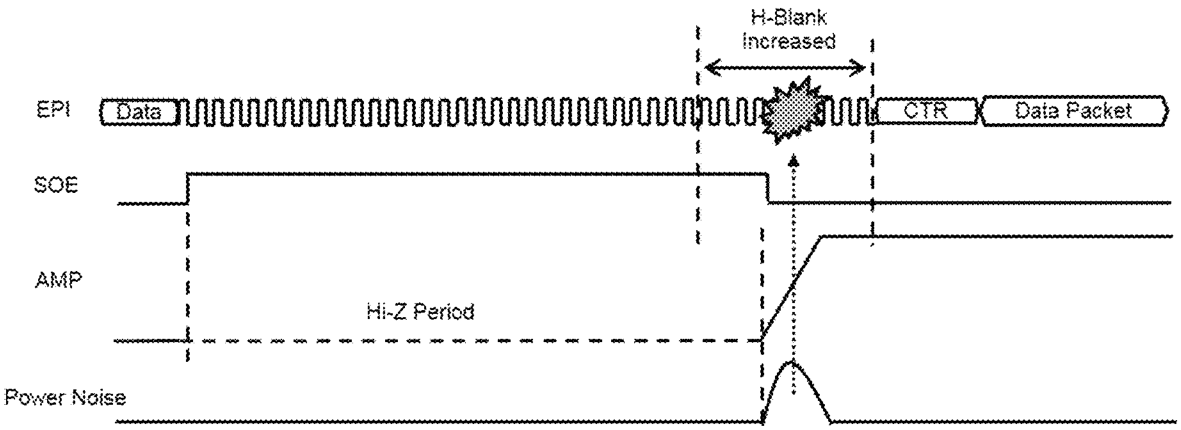

FIG. 8 is a diagram explaining a problem caused by power noise. FIGS. 9 and 10 are diagrams explaining experimental examples for solving a problem caused by power noise.

As shown in FIGS. 6 and 8, when a source output enable signal SOE switches from a logic high level to a logic low level, an output operation of the amplifier AMP included in the multi-channel output circuit may be performed for output of a data voltage. That is, the source output enable signal SOE is a signal for activating output of the data driver 140 (an output operation of the amplifier AMP) (a signal allowing output of the data voltage).

A plurality of amplifiers AMP respectively configured to output data voltages via a plurality of data lines DL1 to DLn is included in the multi-channel output circuit. However, when the plurality of amplifiers AMP performs an output operation for output of data voltages, power noise may be generated within the data driver 140.

There is a higher power noise generation possibility in an output period in which output of the amplifier AMP is performed than in an high impedance period (Hi-Z period) in which output of the amplifier AMP is not performed.

As such, when the latch LAT operates in a state in which power noise is generated within the data driver 140, data latching for reception of a data packet (or a data signal) may not be normally carried out, but may be abnormally carried out. That is, when the latch LAT operates in a state in which power noise is generated, there may be a high possibility that data latch failure (failure causing screen flickering during high frequency transmission) occurs.

In a first experimental example of FIG. 9, the width of a source output enable signal SOE (SOE width) is minimized in order to prevent occurrence of data latch failure. In a second experimental example of FIG. 10, a horizontal blank (H-blank) period is increased corresponding to a time when power noise is generated, in order to prevent occurrence of data latch failure.

It was found that, when the width of the source output enable signal SOE (SOE width) is minimized, as in the first experimental example of FIG. 9, noise may be generated at the DA converter and, as such, output abnormality of the amplifier AMP may occur.

On the other hand, it was found that, when the horizontal blank (H-blank) period is increased, as in the second experimental example of FIG. 10, power noise may be generated during a period in which clock training is carried out and, as such, data latch failure may be prevented.

However, the method of the second experimental example may have another problem of an increase in transmission frequency (or an increase in transmission bandwidth), etc.

due to an increase in horizontal blank (H-blank) period. To this end, the following aspects are proposed.

Figure 11:
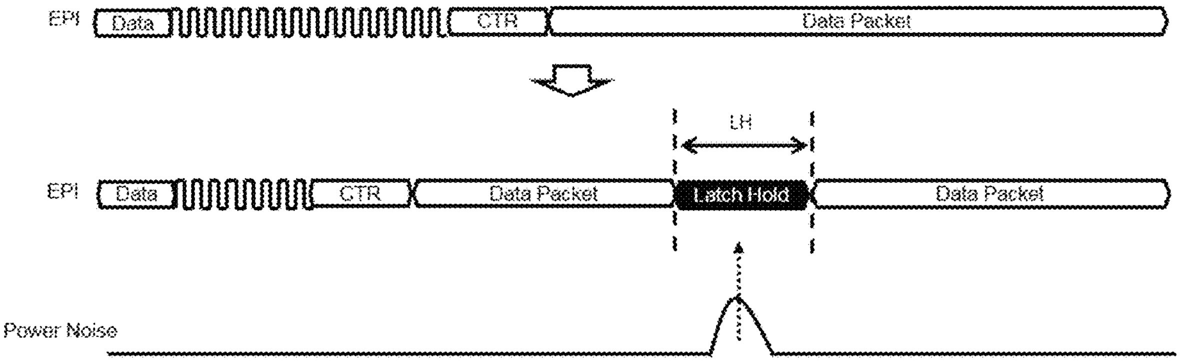
FIG. 11 is a diagram briefly explaining a latch hold method according to a first aspect of the present disclosure.
Figure 12:
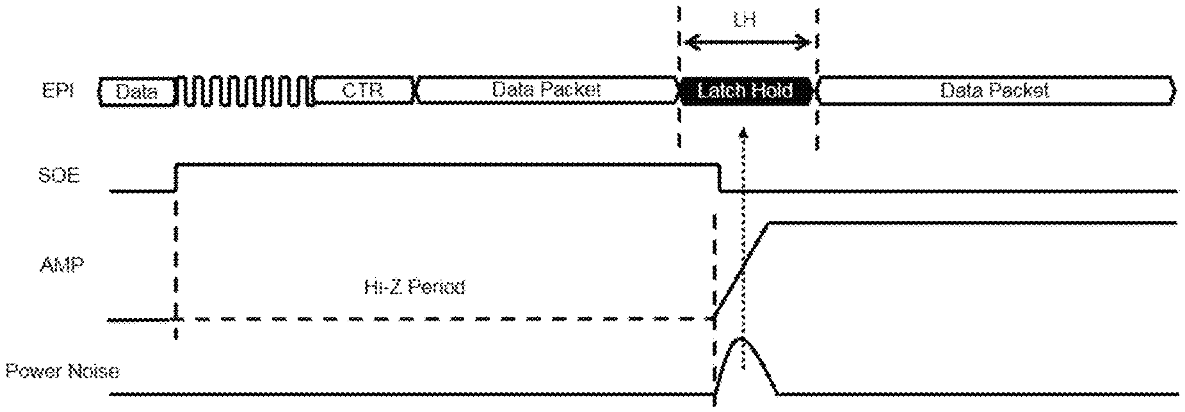
FIG. 12 is a diagram more concretely explaining the latch hold method according to the first aspect of the present disclosure.

FIG. 11 is a diagram briefly explaining a latch hold method according to a first aspect of the present disclosure. FIG. 12 is a diagram more concretely explaining the latch hold method according to the first aspect of the present disclosure.

As shown in FIG. 11, in accordance with the first aspect of the present disclosure, the latch may have a latch hold (LH) period in which a data latch operation is paused corresponding to a power noise generation time.

Latch hold LH may occur in a period in which a data packet including data signals is transmitted, rather than in a period in which a control packet CTR including control signals is transmitted, in order to maintain stable operation of the device.

As shown in FIG. 12, there is a higher power noise generation possibility in an output period in which output of the amplifier AMP is performed than in a high impedance period (Hi-Z period) in which output of the amplifier AMP is not performed.

Accordingly, latch hold LH may occur corresponding to a period in which the source output enable signal SOE switches from a logic high level to a logic low level. In addition, in order to achieve a stable latch hold (LH) operation, latch hold LH may occur immediately before the source output enable signal SOE falls from a logic high level to a logic low level, and may be ended after a predetermined time elapses from disappearance of power noise.

In accordance with the first aspect of the present disclosure, it may be possible to not only eliminate a problem caused by power noise (latch failure), but also to prevent occurrence of other problems possibly occurring in the experimental example, such as output abnormality of the amplifier AMP or an increase in transmission frequency (or an increase in transmission bandwidth) caused by an increased blank period.

Figure 13:
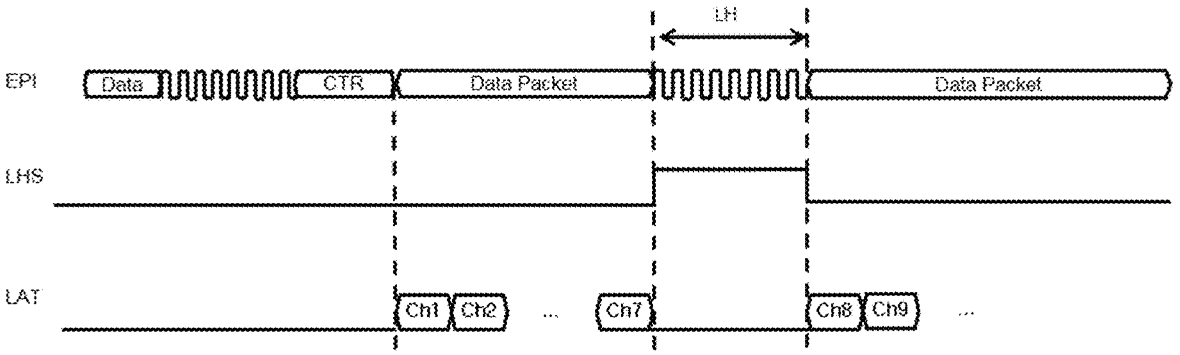
FIG. 13 is a diagram briefly explaining a latch hold method according to a second aspect of the present disclosure.
Figure 14:
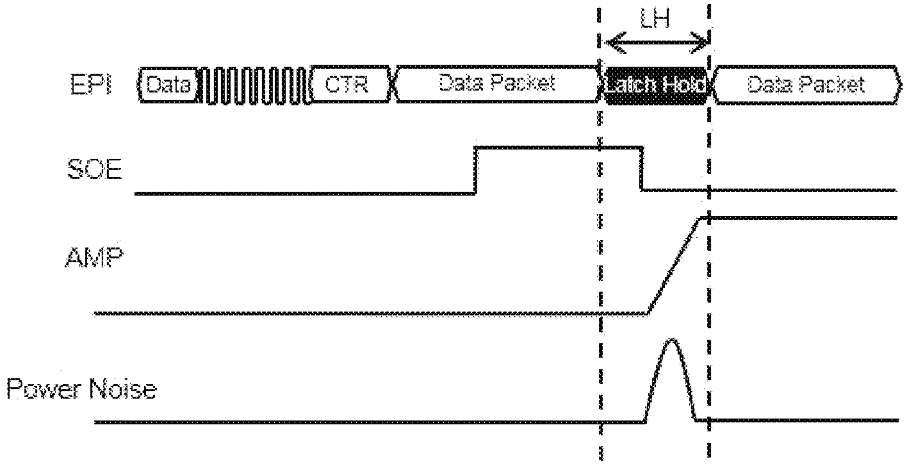
FIG. 14 is a diagram briefly explaining a latch hold method according to a first variant of the second aspect of the present disclosure.
Figure 15:
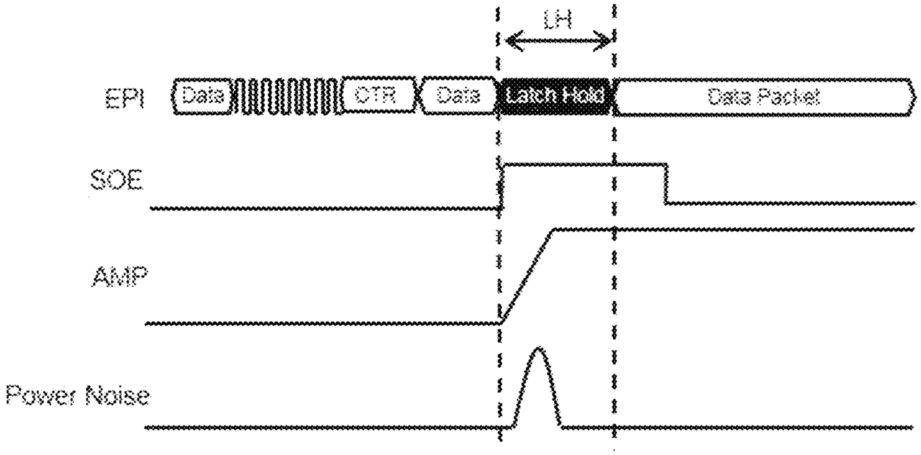
FIG. 15 is a diagram briefly explaining a latch hold method according to a second variant of the second aspect of the present disclosure.

FIG. 13 is a diagram briefly explaining a latch hold method according to a second aspect of the present disclosure. FIG. 14 is a diagram briefly explaining a latch hold method according to a first variant of the second aspect of the present disclosure. FIG. 15 is a diagram briefly explaining a latch hold method according to a second variant of the second aspect of the present disclosure.

As shown in FIG. 13, in accordance with the second aspect of the present disclosure, a latch hold (LH) operation may be carried out corresponding to a time when power noise is generated. The latch hold (LH) operation may be carried out based on an artificially-generated latch hold signal LHS.

A timing controller or a data driver may each recognize a time when a data voltage causing power noise is output, based on operation timing of a device and the device related thereto, respectively. Accordingly, the latch hold signal LHS may be applied to the data driver after being generated from the timing controller, or may be generated within the data driver itself.

A latch LAT included in the data driver may receive data signals included in a data packet on a channel basis in accordance with a data latch operation. However, when a latch hold signal LHS is generated with a logic high level, the latch LAT included in the data driver may pause the data latch operation for a logic-high period of the latch hold signal LHS. When a latch hold signal LHS is subsequently generated a logic low level, the data latch operation may restart.

As such, the data signals included in the data packet may be transmitted in such a manner that first to seventh channel data Ch1 to Ch7 are input, and eighth and ninth channel data Ch8 and Ch9 are subsequently input after pause of data input by a latch hold (LH) operation.

As shown in FIG. 14, in accordance with the first variant of the second aspect of the present disclosure, a latch hold (HL) operation may occur when a source output enable signal SOE switches from a logic high level to a logic low level. That is, the latch hold (LH) operation may occur around a time when the source output enable signal SOE falls to the logic low level (a falling time of the signal SOE).

As shown in FIG. 15, in accordance with the second variant of the second aspect of the present disclosure, a latch hold (LH) operation may occur when a source output enable signal SOE rises from a logic low level to a logic high level. That is, latch hold LH may occur around a time when the source output enable signal SOE rises to the logic high level (a rising time of the source output enable signal SOE) (or may occur in synchronism with the rising time of the signal SOE).

As can be seen from FIGS. 14 and 15, an amplifier AMP may be embodied to generate an output when the source output enable signal SOE falls to a logic low level or may be embodied to generate an output when the source output enable signal SOE rises to a logic high level. Thus, the latch hold (LH) operation may be controlled to occur at a power noise generation time, an output time of the amplifier AMP or to occur at a time determined taking both the times into consideration.

Figure 16:
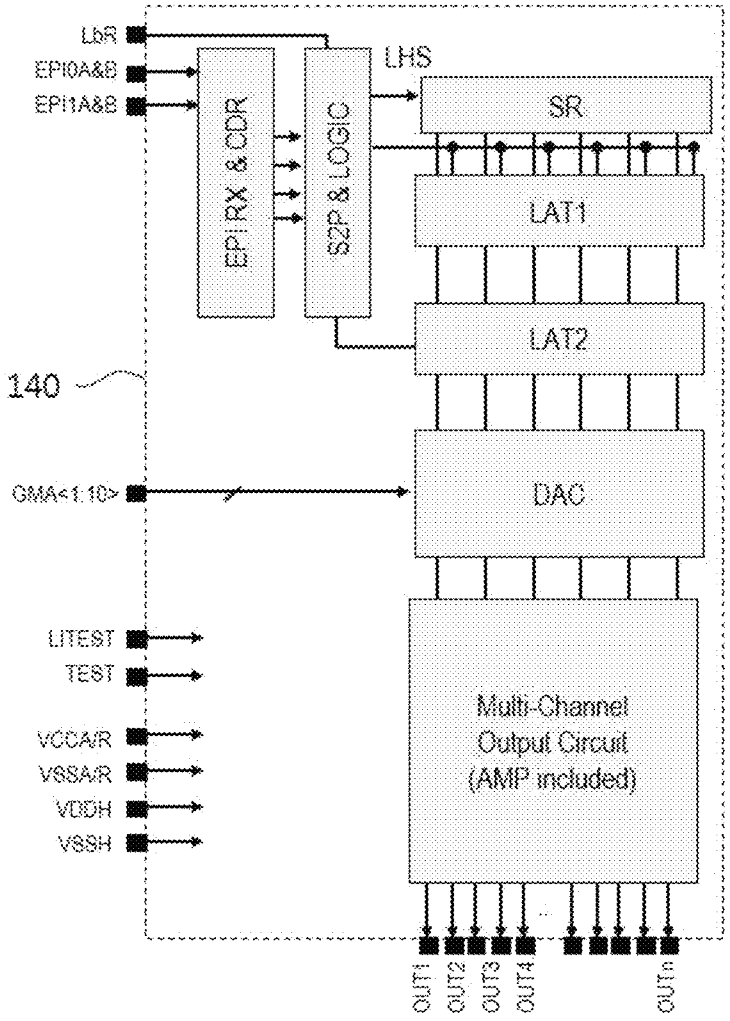
FIG. 16 is a diagram showing internal blocks of a data driver according to a third aspect of the present disclosure.
Figure 17:
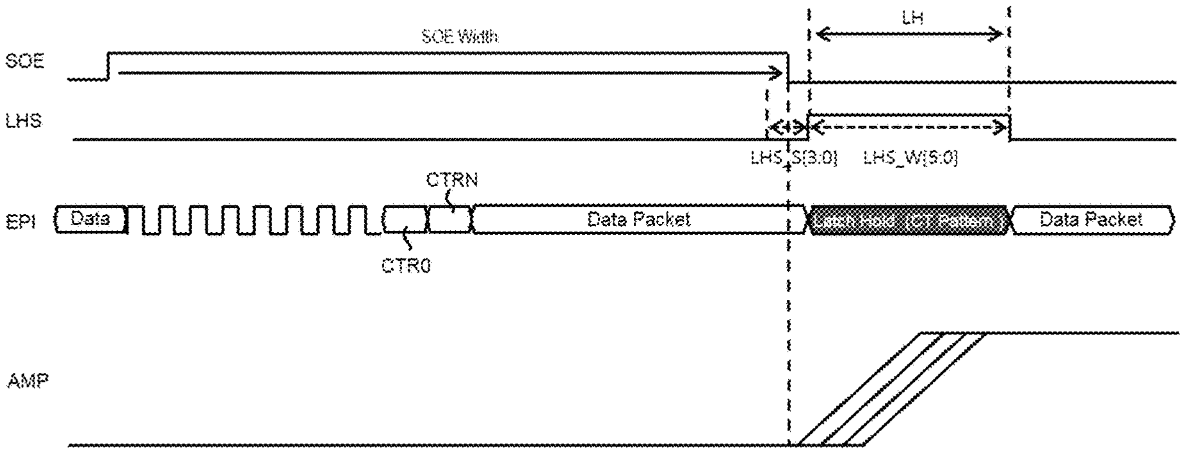
FIG. 17 is a diagram explaining a method for controlling a latch hold signal in accordance with the third aspect of the present disclosure.
Figure 18:
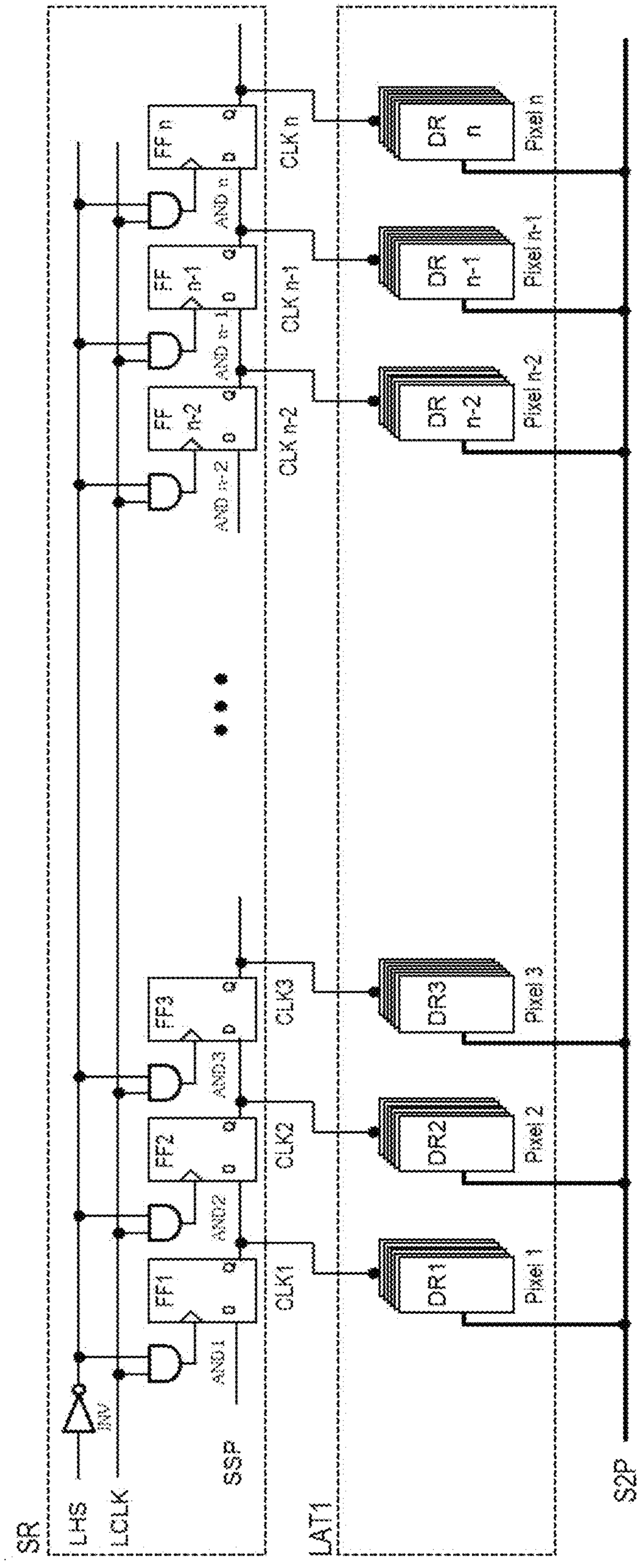
FIGS. 18 and 19 are diagrams explaining a configuration of a part of the internal blocks of the data driver and a variation according to latch hold in the third aspect of the present disclosure.
Figure 19:
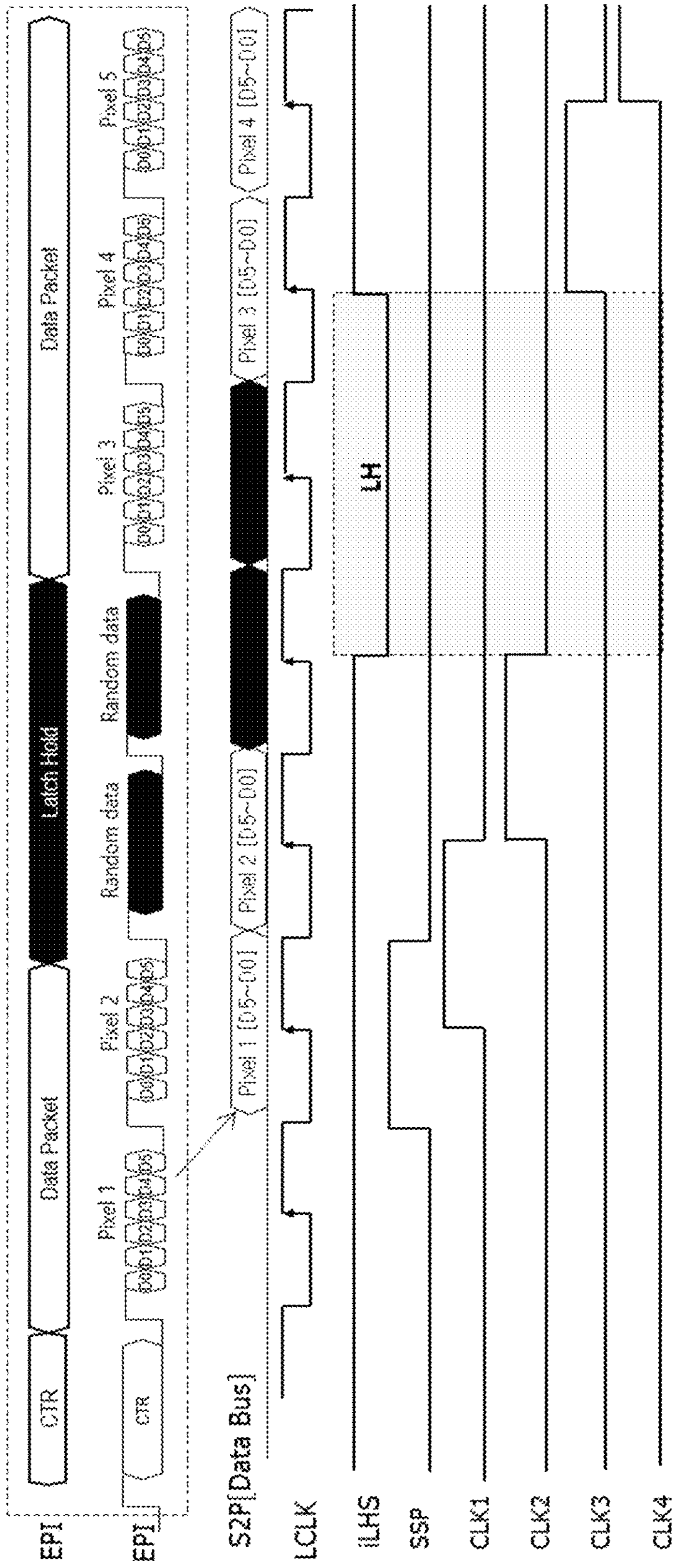

FIG. 16 is a diagram showing internal blocks of a data driver according to a third aspect of the present disclosure. FIG. 17 is a diagram explaining a method for controlling a latch hold signal in accordance with the third aspect of the present disclosure. FIGS. 18 and 19 are diagrams explaining a configuration of a part of the internal blocks of the data driver and a variation according to latch hold in the third aspect of the present disclosure.

As shown in FIG. 16, in accordance with the third aspect of the present disclosure, a data driver 140 may include an interface unit EPI RX & CDR, a logic circuit unit S2P & LOGIC, a shift register SR, a first latch LAT1, a second latch LAT2, a DA converter DAC, a multi-channel output circuit, etc.

The interface unit EPI RX & CDR may include communication terminals EPI0A&B and EPI1A&B, etc. for data communication with a timing controller. The logic circuit unit S2P & LOGIC may include a selection terminal LbR for selection of a latch direction.

The interface unit EPI RX & CDR may receive data via an EPI interface coupled to the timing controller, and may separate the data into control signals and data signals in forms usable in internal devices.

The logic circuit unit S2P & LOGIC may output data signals as well as control signals for control of the shift register SR, the first latch LAT1, the second latch LAT2, the DA converter DAC, the multi-channel output circuit, etc., based on the control signals transferred via the interface unit EPI RX & CDR. In addition, the logic circuit unit S2P & LOGIC may transfer, to the shift register SR, a latch hold signal LHS provided based on signals transferred thereto via the EPI interface.

In addition, the data driver 140 may include a gamma voltage terminal GMA<1:10> for reception of a gamma voltage to be provided to the DA converter DAC, test terminals LITEST and TEST for testing of operations of the internal devices, voltage terminals VCCA/R, VSSA/R, VDDH and VSSH for reception of operating voltages of the internal devices, and output terminals OUT1 to OUTn.

As shown in FIG. 17, in accordance with the third aspect of the present disclosure, the latch hold signal LHS may be generated around a time when a source output enable signal falls to a logic low level (a falling time of the source output enable signal SOE). In addition, when the latch hold signal LHS is generated with a logic high level, a latch hold (LH) operation may be carried out.

The latch hold signal LHS may be generated before or after a time when the source output enable signal falls from a logic high level to a logic low level (a falling edge of the signal) with reference to the entire width thereof (SOE width). The generation time of the latch hold signal LHS, that is, LHS_S[3:0], may become earlier or later in accordance with a data bit value. In addition, the width of the latch hold signal LHS, that is, LHS_W[5:0] may become wider or narrower in accordance with the data bit value. Furthermore, a clock training pattern CT Pattern may be generated in place of a data packet during a latch hold (LH) period in which the latch hold signal LHS is generated with a logic high level.

As shown in FIGS. 18 and 19, the shift register SR according to the third aspect of the present disclosure may include an inverter INV, first to n-th flip-flops FF1 to FFn, first to n-th AND gates AND1 to ANDn, etc. The first to n-th flip-flops FF1 to FFn may each be embodied as a D flip-flop capable of shifting a signal, corresponding to a clock signal applied to a clock terminal thereof, and outputting the shifted signal.

The first to n-th flip-flops FF1 to FFn may be dependently interconnected such that an output from a data output terminal Q of one stage is applied to a data input terminal D of a next stage. Of course, the first flip-flop FF1 disposed at an uppermost stage may receive a signal, such as a source start pulse SSP, from the exterior. The first to n-th flip-flops FF1 to FFn may be connected to the first to n-th AND gates AND1 to ANDn, respectively, such that outputs from output terminals of the AND gates AND1 to ANDn are applied to clock terminals of the flip-flops FF1 to FFn, respectively.

The first latch LAT1 according to the third aspect of the present disclosure may include first to n-th data registers DR1 to DRn, etc. The first to n-th data registers DR1 to DRn may each be connected to a data bus S2P[Data Bus] at an input terminal thereof. The first to n-th data registers DR1 to DRn may also be connected to the output terminals Q of the first to n-th flip-flops FF1 to FFn at clock terminals thereof, respectively.

The first to n-th data registers DR1 to DRn may store, on a pixel basis (on a one-line basis), a data signal transferred thereto via the data bus S2P[Data Bus], corresponding to first to n-th clock signals CLK1 to CLKn output from the output terminals Q of the first to n-th flip-flops FF1 to FFn, respectively. In accordance with operation of the first to n-th data registers DR1 to DRn, data signals transferred in a serial form may be converted into data signals in a parallel form.

Hereinafter, a part of configurations included in the shift register SR and the first latch LAT1 will be described in conjunction with, for example, connection and operation relations thereof. Of course, no description of the remaining configurations included in the shift register SR and the first latch LAT1 will be given because the remaining configurations have the same connection and operation relations as the configuration part to be described hereinafter.

The first flip-flop FF1 may be connected, at the data input terminal D thereof, to a source start pulse line transferring a source start pulse SSP while being connected, at the data output terminal Q thereof, to the data input terminal D of the second flip-flop FF2. The first AND gate AND1 may be connected, at a first input terminal thereof, to a shift clock signal line transferring a shift clock signal LCLK and may be connected, at a second input terminal thereof, to an output terminal of the inverter INV outputting a latch hold signal LHS in an inverted state while being connected, at an output terminal thereof, to the clock terminal of the first flip-flop FF1.

The first flip-flop FF1 may output a first clock signal CLK1 of a logic high level, corresponding to a shift clock signal LCLK of a logic high level (a rising time of the shift clock signal LCLK) generated during a period in which the source start pulse SSP is maintained at a logic high level. The first data register DR1 may store data signals D0 to D5 of a first pixel Pixel1 transferred via the data bus S2P[Data Bus] based on the first clock signal CLK1 output from the first flip-flop FF1.

The second flip-flop FF2 may be connected, at the data input terminal D thereof, to the data output terminal Q of the first flip-flop FF1 while being connected, at the data output terminal Q thereof, to the data input terminal D of the third flip-flop FF3. The second AND gate AND2 may be connected, at a first input terminal thereof, to the shift clock signal line transferring the shift clock signal LCLK and may be connected, at a second input terminal thereof, to the output terminal of the inverter INV outputting the latch hold signal LHS in an inverted state while being connected, at an output terminal thereof, to the clock terminal of the second flip-flop FF2.

The second flip-flop FF2 may output a second clock signal CLK2 of a logic high level, corresponding to the first clock signal CLK1 of a logic high level (a falling time of the first clock signal CLK1) applied during the period in which the source start pulse SSP is maintained at a logic high level. The second data register DR2 may store data signals D0 to D5 of a second pixel Pixel2 transferred thereto via the data bus S2P[Data Bus] based on the second clock signal CLK2 output from the second flip-flop FF2.

A latch hold signal LHS of a logic low level shown in FIG. 17 is converted into a latch hold signal iLHS of a logic high level, as shown in FIG. 19, as the latch hold signal LHS passes through the inverter INV, and, as such, the latch hold signal iLHS of the logic high level is output. On the other hand, a latch hold signal LHS of a logic high level shown in FIG. 17 is converted into a latch hold signal iLHS of a logic low level, as shown in FIG. 19, as the latch hold signal LHS passes through the inverter INV, and, as such, the latch hold signal iLHS of the logic low level is output.

Accordingly, the above-described operation is enabled until the latch hold signal LHS transferred to the input terminal of the inverter INV is applied with a logic low level. On the other hand, when the latch hold signal iLHS of the logic low level is generated by the inverter INV, the first to n-th AND gates AND1 to ANDn do not output 1, but output 0. This is because an AND gate multiplies inputs of both input terminals thereof, thereby generates an output (a logical product) and, as such, outputs 0 when a logic low value or 0 is input to one of the input terminals. As a result, the first to n-th flip-flops FF1 to FFn output clock signals of a low logic level, in place of clock signals of a logic high level, during the latch hold (LH) period in which the latch hold signal iLHS of the low logic level is output.

FIG. 19 shows, as an example, that a third clock signal CLK3 is output after delay of a predetermined time by a latch hold (LH) operation after a second clock signal CLK2 is output. Meanwhile, as can be seen from FIG. 19, although a certain data signal (certain data) may be generated during the latch hold (LH) period, the data signal is not stored in the data register because a clock signal of a logic high level has not been generated.

Figure 20:
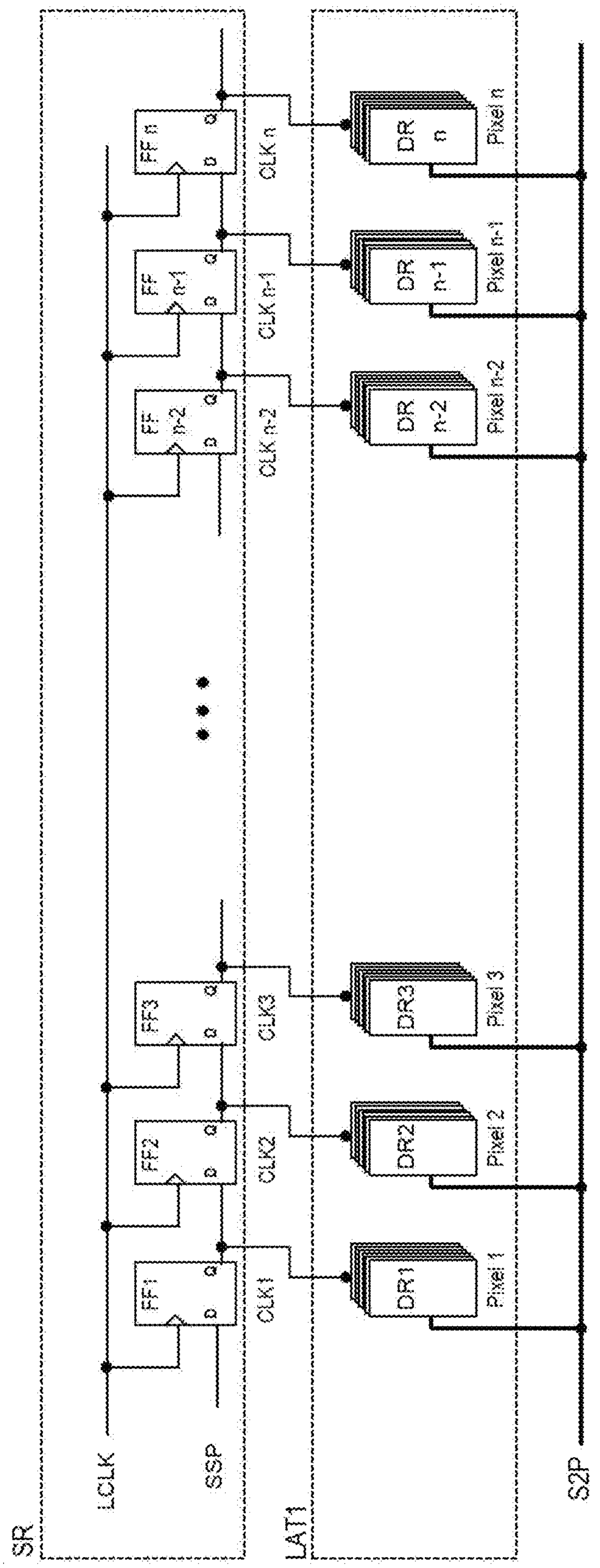
FIGS. 20 and 21 are diagrams briefly comparing an experimental example and the third aspect of the present disclosure with each other and briefly explaining a difference therebetween.
Figure 21:
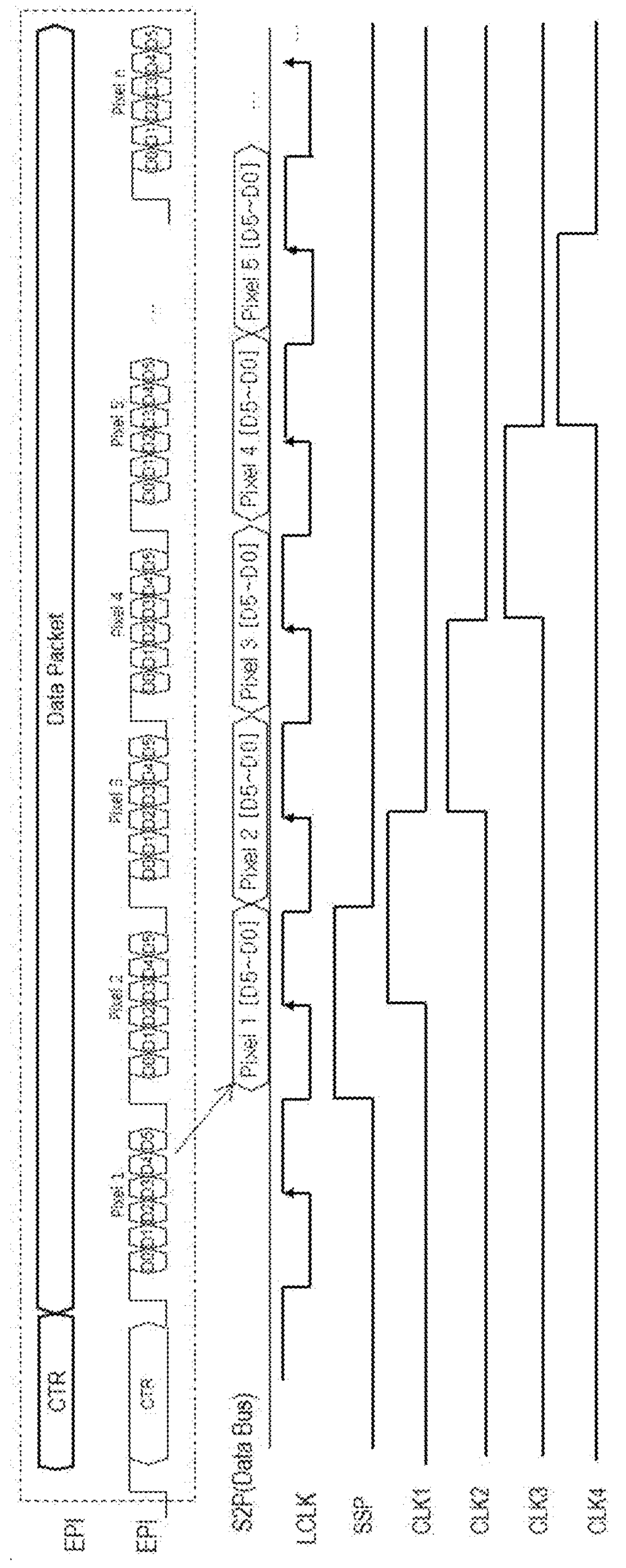

FIGS. 20 and 21 are diagrams briefly comparing an experimental example and the third aspect of the present disclosure with each other and briefly explaining a difference therebetween.

As shown in FIGS. 20 and 21, a shift register SR according to the experimental example may include first to n-th flip-flops FF1 to FFn, etc. In addition, a first latch LAT1 according to the experimental example may include first to n-th data registers DR1 to DRn, etc.

A latch hold signal is not applied to the structure according to the experimental example. For this reason, it is difficult to eliminate problems caused by power noise because the latch hold signal LHS is not applied, and the latch hold (LH) operation based on the latch hold signal LHS is not carried out. As such, when power noise is generated, there may be a high possibility that data latch failure described with reference to FIG. 8 occurs.

Hereinafter, a fourth aspect of the present disclosure will be described. The following description will be given mainly in conjunction with a configuration different from that of the third aspect.

Figure 22:
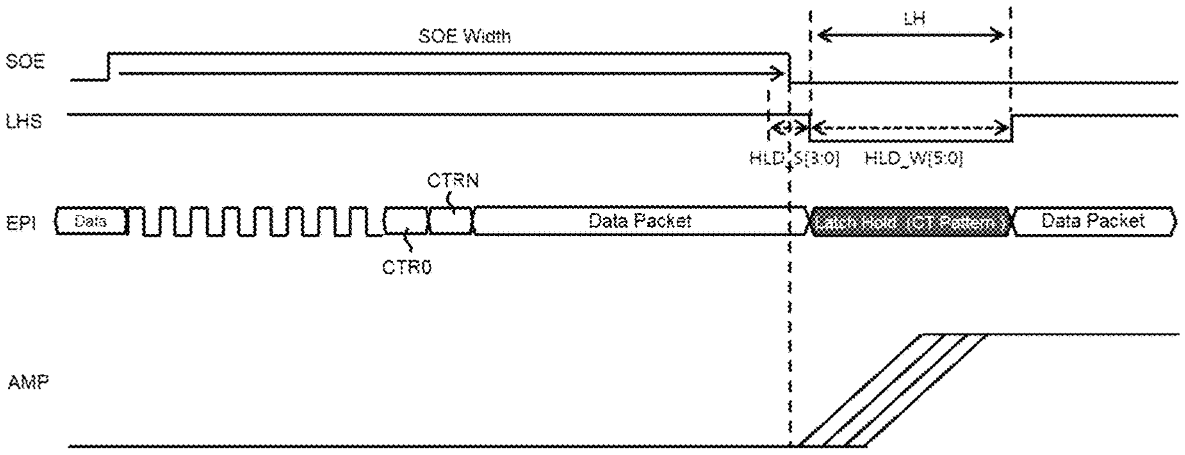
FIG. 22 is a diagram explaining a control method of a latch hold signal according to a fourth aspect of the present disclosure.
Figure 23:
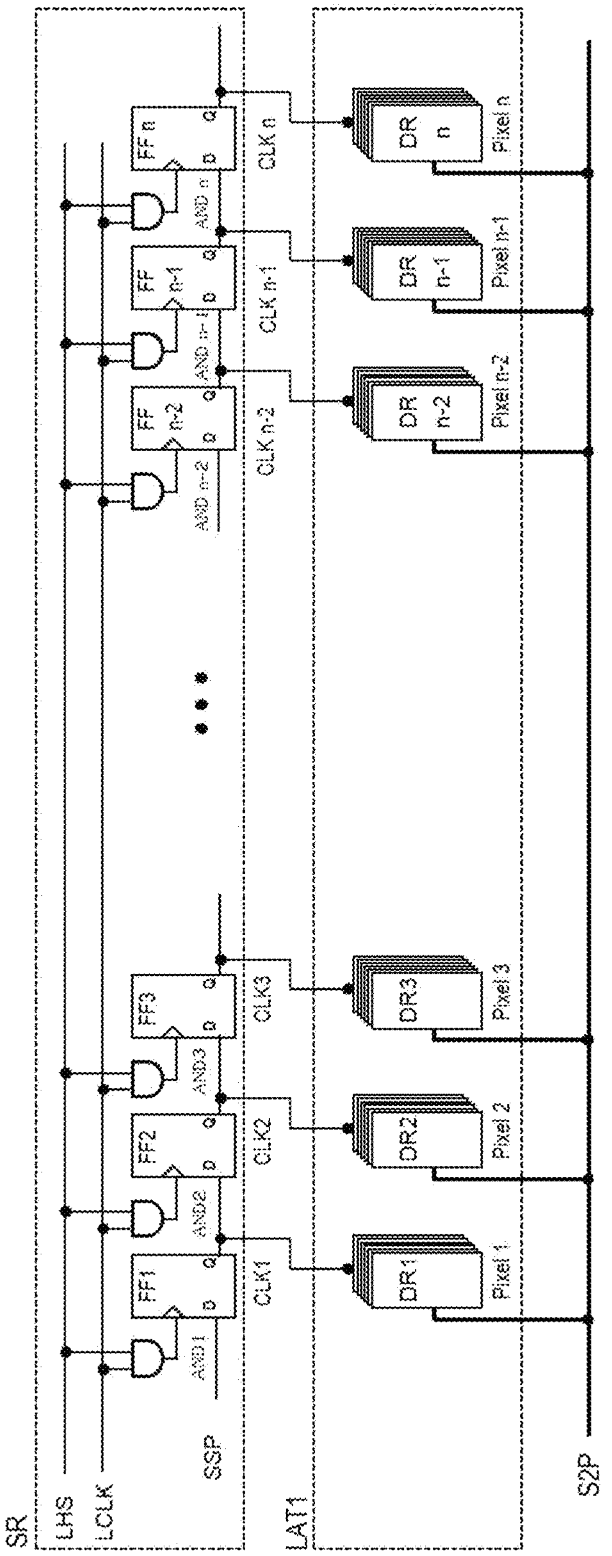
FIG. 23 is a diagram explaining a part of configurations of internal blocks of a data driver according to the fourth aspect of the present disclosure.

FIG. 22 is a diagram explaining a control method of a latch hold signal according to the fourth aspect of the present disclosure. FIG. 23 is a diagram explaining a part of configurations of internal blocks of a data driver according to the fourth aspect of the present disclosure.

As shown in FIG. 22, in accordance with the fourth aspect of the present disclosure, a latch hold signal LHS may be generated around a time when a source output enable signal SOE falls to a logic low level (a falling time of the signal SOE). In addition, when the latch hold signal LHS is generated with a low logic level, a latch hold (LH) operation may be carried out. That is, a latch hold (LH) operation may be carried out by the latch hold signal LHS generated in a form inverted from that of the third aspect.

As shown in FIG. 23, a shift register SR according to the fourth aspect of the present disclosure may include first to n-th flip-flops FF1 to FFn, first to n-th AND gates AND1 to ANDn, etc. In the fourth aspect of the present disclosure, no inverter is included in a clock terminal of the shift register SR, differently from the third aspect.

The first to n-th flip-flops FF1 to FFn may be dependently interconnected such that an output from a data output terminal Q of one stage is applied to a data input terminal D of a next stage. Of course, the first flip-flop FF1 disposed at an uppermost stage may receive a signal, such as a source start pulse SSP, from an exterior. The first to n-th flip-flops FF1 to FFn may be connected to the first to n-th AND gates AND1 to ANDn, respectively, such that outputs from output terminals of the AND gates AND1 to ANDn are applied to clock terminals of the flip-flops FF1 to FFn, respectively.

A first latch LAT1 according to the fourth aspect of the present disclosure may include first to n-th data registers DR1 to DRn, etc. The first to n-th data registers DR1 to DRn may each be connected to a data bus S2P[Data Bus] at an input terminal thereof. The first to n-th data registers DR1 to DRn may also be connected to the output terminals of the first to n-th flip-flops FF1 to FFn at clock terminals thereof, respectively.

The first to n-th data registers DR1 to DRn may store, on a pixel basis (on a one-line basis), a data signal transferred thereto via the data bus S2P[Data Bus], corresponding to first to n-th clock signals CLK1 to CLKn output from the output terminals Q of the first to n-th flip-flops FF1 to FFn, respectively. In accordance with operation of the first to n-th data registers DR1 to DRn, data signals transferred in a serial form may be converted into data signals in a parallel form.

Hereinafter, a part of configurations included in the shift register SR and the first latch LAT1 will be described in conjunction with, for example, connection and operation relations thereof. Of course, no description of the remaining configurations included in the shift register SR and the first latch LAT1 will be given because the remaining configurations have the same connection and operation relations as the configuration part to be described hereinafter.

The first flip-flop FF1 may be connected, at the data input terminal D thereof, to a source start pulse line transferring a source start pulse SSP while being connected, at the data output terminal Q thereof, to the data input terminal D of the second flip-flop FF2. The first AND gate AND1 may be connected, at a first input terminal thereof, to a shift clock signal line transferring a shift clock signal LCLK and may be connected, at a second input terminal thereof, to a latch hold signal line transferring a latch hold signal LHS while being connected, at an output terminal thereof, to the clock terminal of the first flip-flop FF1.

The first flip-flop FF1 may output a first clock signal CLK1 of a logic high level, corresponding to a shift clock signal LCLK of a logic high level (a rising time of the shift clock signal LCLK) generated during a period in which the source start pulse SSP is maintained at a logic high level. The first data register DR1 may store a data signal of a first pixel Pixel1 transferred via the data bus S2P[Data Bus] based on the first clock signal CLK1 output from the first flip-flop FF1.

The second flip-flop FF2 may be connected, at the data input terminal D thereof, to the data output terminal Q of the first flip-flop FF1 while being connected, at the data output terminal Q thereof, to the data input terminal D of the third flip-flop FF3. The second AND gate AND2 may be connected, at a first input terminal thereof, to the shift clock signal line transferring the shift clock signal LCLK and may be connected, at a second input terminal thereof, to the latch hold signal line transferring the latch hold signal LHS while being connected, at an output terminal thereof, to the clock terminal of the second flip-flop FF2.

The second flip-flop FF2 may output a second clock signal CLK2 of a logic high level, corresponding to the first clock signal CLK1 of a logic high level (a falling time of the first clock signal CLK1) applied during the period in which the source start pulse SSP is maintained at a logic high level. The second data register DR2 may store a data signal of a second pixel Pixel2 transferred thereto via the data bus S2P[Data Bus] based on the second clock signal CLK2 output from the second flip-flop FF2.

As can be seen from FIGS. 22 and 23, the first to n-th AND gates AND1 to ANDn do not output 1, but output 0, when a latch hold signal LHS of a logic low level is applied thereto. As a result, the first to n-th flip-flops FF1 to FFn output clock signals of a low logic level, in place of clock signals of a logic high level, during a latch hold (LH) period in which the latch hold signal LHS of the low logic level is output.

As apparent from the above description, in accordance with the present disclosure, there is an effect capable of eliminating a problem caused by power noise (latch failure, screen flickering, etc.), thereby achieving an enhancement in display quality. In accordance with the present disclosure, there is an effect capable of preventing output abnormality of an amplifier, an increase in blank period, an increase in transmission frequency (or an increase in transmission bandwidth), etc., thereby achieving an enhancement in driving reliability and driving stability.

The foregoing descriptions and the accompanying drawings have been presented in order to illustratively explain technical ideas of the present disclosure. A person skilled in the art to which the present disclosure pertains can appreciate that diverse modifications and variations by combining, dividing, substituting for, or changing constituent elements may be possible without changing essential characteristics of the present disclosure. Therefore, the foregoing aspects disclosed herein shall be interpreted as illustrative only but not as limitative of the principle and scope of the present disclosure. It should be understood that the scope of the present disclosure shall be defined by the appended claims and all equivalents thereto fall within the scope of the present disclosure.

What is claimed is:

1. A light emitting display device comprising:

a display panel configured to display an image;

a data driver configured to supply a data voltage to the display panel; and a timing controller configured to identify an amplifier activation event and provide a data signal to control data latch operation of the data driver based on the amplifier activation event, wherein the data driver is configured to pause the data latch operation during conversion of the data signal into the data voltage during a power noise event caused by the amplifier activation event within the data driver.

2. The light emitting display device according to claim 1, wherein the data driver pauses the data latch operation based on a falling time or a rising time of a source output enable signal.

3. The light emitting display device according to claim 1, wherein the pause of the data latch operation is based on a latch hold signal generated from the data driver or the timing controller.

4. The light emitting display device according to claim 3, wherein the data driver comprises a shift register configured to pause output of a clock signal based on the latch hold signal.

5. The light emitting display device according to claim 4, wherein the shift register comprises:

an AND gate configured to AND the latch hold signal and a shift clock signal and to output a resultant signal; and a flip-flop configured to output the clock signal based on the signal output from the AND gate and a pulse externally applied thereto.

6. The light emitting display device according to claim 5, wherein, when the latch hold signal is generated with a logic low level, a latch connected to the shift register has a latch hold period in which the latch pauses the data latch operation.

7. The light emitting display device according to claim 4, wherein the shift register comprises:

an inverter configured to invert the latch hold signal and to output an inverted latch hold signal;

an AND gate configured to AND the inverted latch hold signal output from the inverter and a shift clock signal and to output a resultant signal; and a flip-flop configured to output the clock signal based on the signal output from the AND gate and a pulse externally applied thereto.

8. The light emitting display device according to claim 7, wherein, when the latch hold signal is generated with a logic high level, a latch connected to the shift register has a latch hold period in which the latch pauses the data latch operation.

9. The light emitting display device according to claim 1, wherein the data driver is configured generate a latch hold signal based on a noise generation event or an output event of the data driver.

10. The light emitting display device according to claim 1, wherein the data driver is configured to pause the data latch operation based on an embedded clock point-to-point interface (EPI) signal from the timing controller, wherein the timing controller generates a latch hold signal based on a noise generation event or an output event of the data driver.

11. The light emitting display device according to claim 1, wherein the pause occurs after latching first data for a first channel and before latching data for a second channel, wherein the second channel is adjacent to the first channel.

12. A method for driving a light emitting display device including a display panel configured to display an image, a data driver configured to supply a data voltage to the display panel, and a timing controller configured to control the data driver, comprising:

identify activation event;

transferring, to the data driver, data comprising a control packet and a data packet via an interface coupled between the timing controller and the data driver; and during conversion of the data packet into the data voltage, delaying a data latch operation during a latch hold period based on noise caused by the amplifier activation event in the data driver.

13. The method according to claim 12, wherein, the latch hold period is generated based on a falling time or a rising time of a source output enable signal activating output of the data driver.

14. The method according to claim 12, wherein the data latch operation comprises selecting an output channel for a portion of the data packet, wherein the portion of the data packet is converted into a voltage for driving the light emitting display device.

15. A data driver, comprising:

a shift register configured to receive a data signal from a timing controller and output a clock signal;

a latch configured to latch the data signal based on the clock signal;

a digital to analog converter (DAC) configured to convert the data signal into data voltages to drive a display device; and an output amplifier circuit configured to output the data voltages, wherein the data driver is further configured to interrupt and delay latching of the data signal based on a latch hold signal associated with noise caused by an activation event of the output amplifier circuit.

16. The data driver of claim 15, wherein the shift register is configured to delay the clock signal to interrupt and delay latching of the data signal.

17. The data driver of claim 15, wherein the interrupt and delay occurs after latching first data for a first channel and before latching data for a second channel, wherein the second channel is adjacent to the first channel.

18. The data driver of claim 15, wherein the latch hold signal is included in an embedded clock point-to-point interface (EPI) signal from the timing controller.

* * * * *